United States Patent [19]
Dumoulin et al.

[11] Patent Number: 6,115,485
[45] Date of Patent: Sep. 5, 2000

[54] INTRODUCING REDUCED DATA SET INFORMATION INTO A PRIMARY IMAGE DATA SET

[75] Inventors: Charles Lucian Dumoulin, Ballston Lake; Robert David Darrow, Scotia, both of N.Y.

[73] Assignee: General Electric Company, Schenectady, N.Y.

[21] Appl. No.: 08/944,524

[22] Filed: Oct. 6, 1997

[51] Int. Cl.[7] ........................................ G06K 9/00
[52] U.S. Cl. .............................. 382/128; 382/284
[58] Field of Search ................. 380/42, 50, 54; 714/701; 348/461, 467, 474; 382/100, 128, 130, 131, 232, 284

[56] References Cited

U.S. PATENT DOCUMENTS

| | | | |
|---|---|---|---|
| 5,410,250 | 4/1995 | Brown | 324/309 |
| 5,553,113 | 9/1996 | Weedon | 378/98.5 |
| 5,659,726 | 8/1997 | Sandford, II et al. | 395/612 |
| 5,689,587 | 11/1997 | Bender et al. | 382/232 |
| 5,721,788 | 2/1998 | Powell et al. | 382/100 |
| 5,793,883 | 8/1998 | Kim et al. | 382/128 |
| 5,905,819 | 5/1999 | Daly | 382/284 |

*Primary Examiner*—Andrew W. Johns
*Attorney, Agent, or Firm*—Marvin Snyder; Douglas E. Stoner

[57] ABSTRACT

Secondary data set information is incorporated into a primary data set (such as a digital image) retaining a desired dynamic range and retaining the original primary set data quality. The secondary data set information is 'smuggled' into the least significant bits of the primary data set to result in an enhanced data set. If desired, the primary data word can be shifted toward the most significant bit. The enhanced data set may be viewed as if it were the original primary data set with existing playback devices, however it now includes additional 'smuggled' information which may be played back in coordination with the primary data set information. One example is flow-direction information 'smuggled' into an angiographic image. The least significant bits of the enhanced data words may be used to select the color map and color code the images. A user-adjustable intensity threshold can also be employed to select between color maps. Information stored in this fashion results in a substantial savings in disk storage requirements. Also, since the information of the primary and secondary data sets are merged into a single word, they will remain together throughout many different types of processing, such as maximum intensity projection in volumetric imaging.

12 Claims, 9 Drawing Sheets

INTRODUCING REDUCED DATA SET INFORMATION INTO A PRIMARY IMAGE DATA SET

BACKGROUND OF THE INVENTION

1. Field of the Invention

This invention relates to data compression and playback.

2. Discussion of Prior Art

Related data sets may be closely linked such that it is desirable to play back both simultaneously. Several volumetric data sets measuring different physical parameters sampled at substantially the same locations can exist. For example, in meteorological data this may be wind velocity and temperature of a given volume.

This may also apply to several volumetric data sets acquired by a medical imaging device of the same volume of a subject. For example, in ultrasonic imaging, a Doppler shift data set in the detected ultrasonic frequency signal may be used to quantify blood speed and direction of flow in addition to the standard imaging data set.

In Magnetic Resonance Imaging, thermal and velocity data sets may be used in addition to the standard MR image data set, the additional information being played back in imaging by color coding on an otherwise gray-scale image. Color coded overlays have been used to show thermal hot-spots in phase-sensitive temperature imaging. Color coded overlays have also been used to highlight areas of activation in functional brain MRI scans.

One challenge with existing methods of playback is that the data set containing the additional information is sometimes as large (or larger) than the primary data set. This can greatly overload the disk capacity and data-transfer bandwidth of a scanner.

Playback of processed data is also difficult since much information may be lost during processing. For example, in MR imaging playback, it is frequently convenient to reduce a three-dimensional data set into a two-dimensional projection image. This is often done using a Maximum Intensity Projection (MIP). Current methods for the generation of MIP images from three-dimensional phase contrast angiograms are applied to the magnitude component of the data, thereby losing all directional information. MIP data from the quantitative velocity data could be performed, but the MIP would have to be performed three times (one for each flow component) over the three-dimensional data set to provide a full analysis.

Currently, there is a need for a system which incorporates additional information in primary data sets allowing display of more than one parameter simultaneously.

BRIEF DESCRIPTION OF THE DRAWINGS

The features of the invention believed to be novel are set forth with particularity in the appended claims. The invention itself, however, both as to organization and method of operation, together with further objects and advantages thereof, may be best understood by reference to the following description taken in conjunction with the accompanying drawing in which:

SUMMARY OF THE INVENTION

Figure 1:
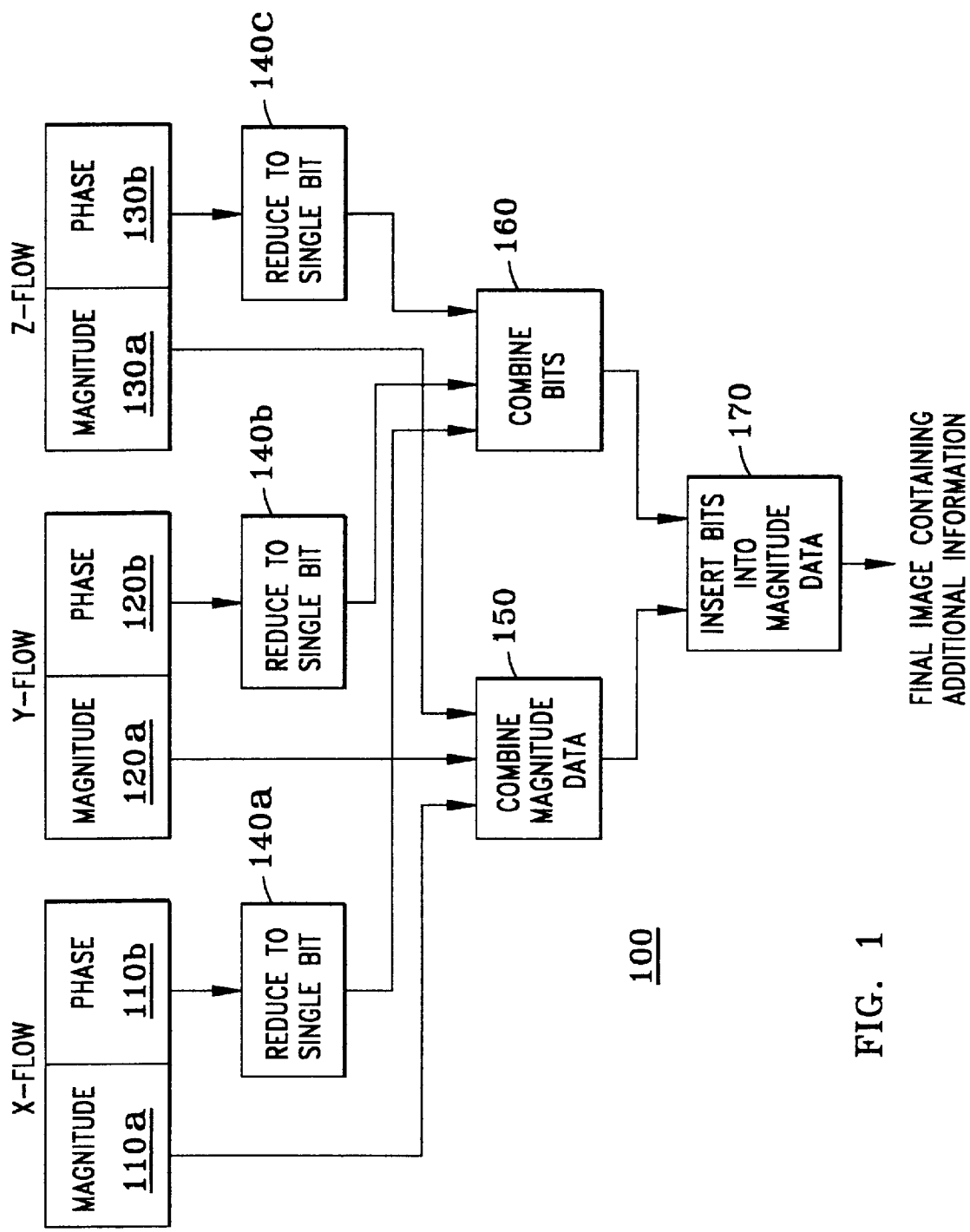
FIG. 1 is a simplified block diagram of a method for incorporating phase information from a phase-sensitive MR data acquisition into magnitude data from the same acquisition.

There is a need to store additional information in primary data sets for later enhanced playback. This may be applied to imaging showing regions of activation in functional MRI images, and flow-direction information in MR angiograms without, increasing the size of the stored data.

To be useful, the enhanced data set should be compatible with existing display methods, such as filming and direct viewing on a gray-scale monitor and data reduction schemes (such as MIP).

In the present invention, primary data words are mathematically altered to 'smuggle' in additional information from a secondary data set. This additional information is then used to enhance the playback of the enhanced data set. An example would be changing the pixel color and/or intensity of a display to illustrate selected features and/or aspects of a digital image.

The least significant bits of the digital words in the pixels of the enhanced data set are used to store the additional information. This is accomplished by shifting the digital words of the primary data set by a selected number of bits, thereby vacating the least significant bits. For example, if three bits of additional information are desired, then each pixel in the digital image would be multiplied by $2^3=8$. Although the dynamic range of the image data is reduced by three bits, in practice this will rarely present a problem since most images do not make full use of their dynamic range (typically 16-bits or 32-bits).

When the dynamic range of the image encompasses the full word size, however, an alternate embodiment of the present invention in which the least significant bits of the original image data are replaced with the additional information bits can be employed.

One use of the present invention is in Phase-contrast Magnetic Resonance Angiography (MRA). Here, the direction of blood flow may be incorporated as additional information in the digital display word.

Once the additional information is 'smuggled' into the data as part of the acquisition process, an operator may later examine the enhanced data set during playback. In imaging, if the operator uses conventional filming functions or views the data on a gray-scale display (such as the scanner console) then the enhanced images will appear as normal gray-scale images. If the operator desires, however, the bits may be used to control the color of the viewed pixels.

If the 'smuggled' bits are used to colorize data, then regions of the image containing noise will also be colorized. This may present an undesirable display. To avoid this problem, a control similar to those used for window and leveling of gray-scale data can be used to specify a threshold for the application of the color look-up table. For example, if this threshold is relatively high, then only intense pixels will be colorized. If the threshold is relatively low, then more pixels will be colorized.

One significant advantage of colorizing data with additional information which has been 'smuggled' into the original image data is that the data can be processed by Maximum Intensity Projection (MIP) algorithms methods without loss of the 'smuggled' bits since they are now part of the display word. Consequently, a two-dimensional projection can be manipulated and colorized as easily as the source three-dimensional image.

OBJECTS OF THE INVENTION

It is an object of the present invention to provide a system which combines digital information from two or more independent sources into a single image to reduce data storage requirements.

It is another object of the present invention to provide a system for the display of image data containing information from two or more independent sources.

It is another object of the present invention to provide color coding of magnetic resonance angiograms.

It is another object of the present invention to provide color coding of functional magnetic resonance images.

It is another object of the present invention to combine information acquired with multiple imaging modalities.

DETAILED DESCRIPTION OF THE INVENTION

In the present invention information from two or more data sets are combined into a single enhanced data set in which one component of information is placed in the most-significant bits of the pixel display word and the other components of information are placed in the least-significant bits of the enhanced data words. Since the additional components of information are placed in bit locations which are less significant than the lowest bits of the first component of information, the combined data set can be manipulated and displayed with conventional means. The additional information, however, can be used in manipulations and/or displays if desired.

FIG. 1 illustrates a first embodiment of the present invention in which Phase-Contrast Magnetic Resonance Angiography (PC-MRA) data is processed. Phase-Contrast Magnetic Resonance Angiography data consists of two components of information. The first component is contained in the magnitude of the acquired MR signal and reflects the strength of the MR signal. The second component is contained in the phase of the acquired MR signal and reflects the velocity of the material giving the MR signal.

In phase-contrast MRA up to three orthogonal flow-sensitive acquisitions are performed in each slice of the subject. Consequently, a three-dimensional Phase Contrast (3DPC) angiogram consists of up to four different three-dimensional data sets after image reconstruction. These data sets are: 1) magnitude data, 2) X-flow, 3) Y-flow and 4) Z-flow. Each of the flow data sets consists of a magnitude component which reflects the signal intensity of the moving blood, and a phase component which reflects the blood's velocity. Using one embodiment of the present invention, the X-flow, Y-flow and Z-flow velocity data can each be reduced to a single bit giving the direction of flow (e.g. 0=left, 1=right). These three bits of information can then be inserted as the least significant bits of the magnitude data set to give an enhanced data set.

In FIG. 1, an X-flow sensitive image containing a magnitude component 110a and a phase component 110b, a Y-flow sensitive image containing a magnitude component 120a and a phase component 120b and a Z-flow sensitive image containing a magnitude component 130a and a phase component 130b are treated with the system of the present invention. It is instructive to note that the present invention can be applied to all types of PC-MRA data including two- and three-dimensional data sets.

In the present embodiment of the invention, X-flow phase component 110b, Y-flow phase component 120b and Z-flow phase component 130b are each reduced to a single bit of information for each pixel. One useful reduction method is to extract the sign of the phase components in order to obtain a single data bit for each of the X, Y and Z-flow images to characterize the direction of flow. For example, if the phase of the Z component data is positive, that would indicate that the direction of flow was in the positive Z direction and thus, the Z bit would be set (i.e. =1). Conversely, if the flow was in the negative Z direction, then the phase of the Z component would be negative and the Z bit would not be set (i.e. =0). Reduction of the X-flow data is accomplished with an X phase reduction step 140a, reduction of the Y-flow data is accomplished with a Y phase reduction step 140b and reduction of the Z-flow data is accomplished with a Z phase reduction step 140c. The individual bits are then combined into a single three bit word using a bit combine step 160.

In the present embodiment the magnitude components of the X-flow, Y-flow and Z-flow images are combined in a magnitude combine step 150. In the presently preferred embodiment the magnitude components are combined in a fashion well know to those skilled in the art using the equation:

Combined magnitude=square root of $(X^2+Y^2+Z^2)$     (1)

Where X, Y and Z are the magnitude of the X-flow, Y-flow and Z-flow image data respectively.

Once the X, Y and Z magnitude components have been combined, the resultant image data has pixel intensities which reflect the speed of flow within the imaged vessels, but does not contain any information regarding the direction of flow. Conversely, the three bit word computed in combine step 160 contains direction of flow information, but does not contain any information regarding the strength of the MR signal. In the present invention, the three bit word computed in combine step 160 is inserted into the least-significant bit locations of the combined magnitude component determined in magnitude combine step 150. This insertion is performed in an insertion step 170. If desired the combined magnitude data can be shifted into the more significant bit locations prior to the insertion of the three bit word. This preserves the entire image content provided there is sufficient dynamic range in the original magnitude data.

Alternatively, the three least significant bits of the combined magnitude data can be replaced with the three bit word. This alters the fine intensity structure of the image (i.e. noise), but preserves the dynamic range.

Figure 2:
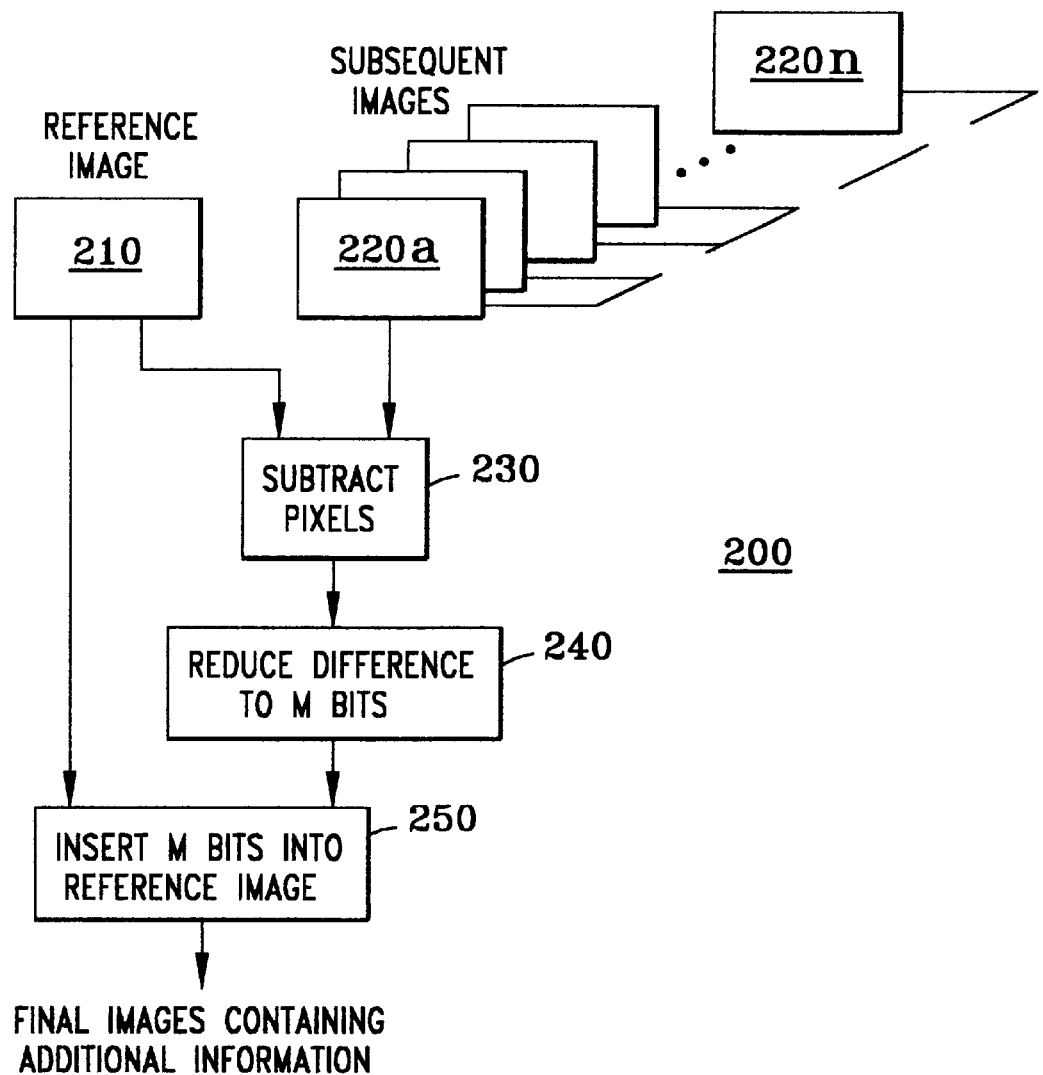
FIG. 2 is a simplified block diagram of a method for incorporating activation information from a functional MR data acquisition into magnitude data from the same acquisition.

A second embodiment of the present invention is illustrated in FIG. 2 in which data from a Functional Magnetic Resonance Imaging (fMRI) data is processed. In this embodiment, a reference scan 210 is first acquired. A plurality of n subsequent images 220a, 220b, 220c . . . 220n, are then acquired. The magnitude of pixels in each subsequent image 220a, 220b, 220c . . . 220n are then subtracted from the magnitude of corresponding pixels in reference image 210 using a subtraction step 230. The result of each subtraction is then reduced to a selected number, M, bits of data in a difference reduction step 240. In one embodiment the difference data are scaled so that all possible values lie between $-(2^{M-1}-1)$ to $2^{M-1}$. In an alternate embodiment, the sign of the difference is assumed to be positive and the difference data is scaled so that all possible values lie between 0 and $2^M-1$.

Once the reduced data has been computed, it is inserted into the least significant bits of the reference image using a bit insertion step 250. As with the first preferred embodiment, the reference pixel data can be shifted into the more significant bits prior to insertion of the reduced data, or if desired, the reduced data can replace the least significant bits of the reference image.

It should be noted that the second embodiment of the present invention also has application to any digital imaging method in which a reference image is acquired and compared to subsequent images. These applications include, but are not limited to: temperature sensitive MR imaging, MR spectroscopic imaging, digital x-ray angiography and highlighting differences in satellite images.

Figure 3:
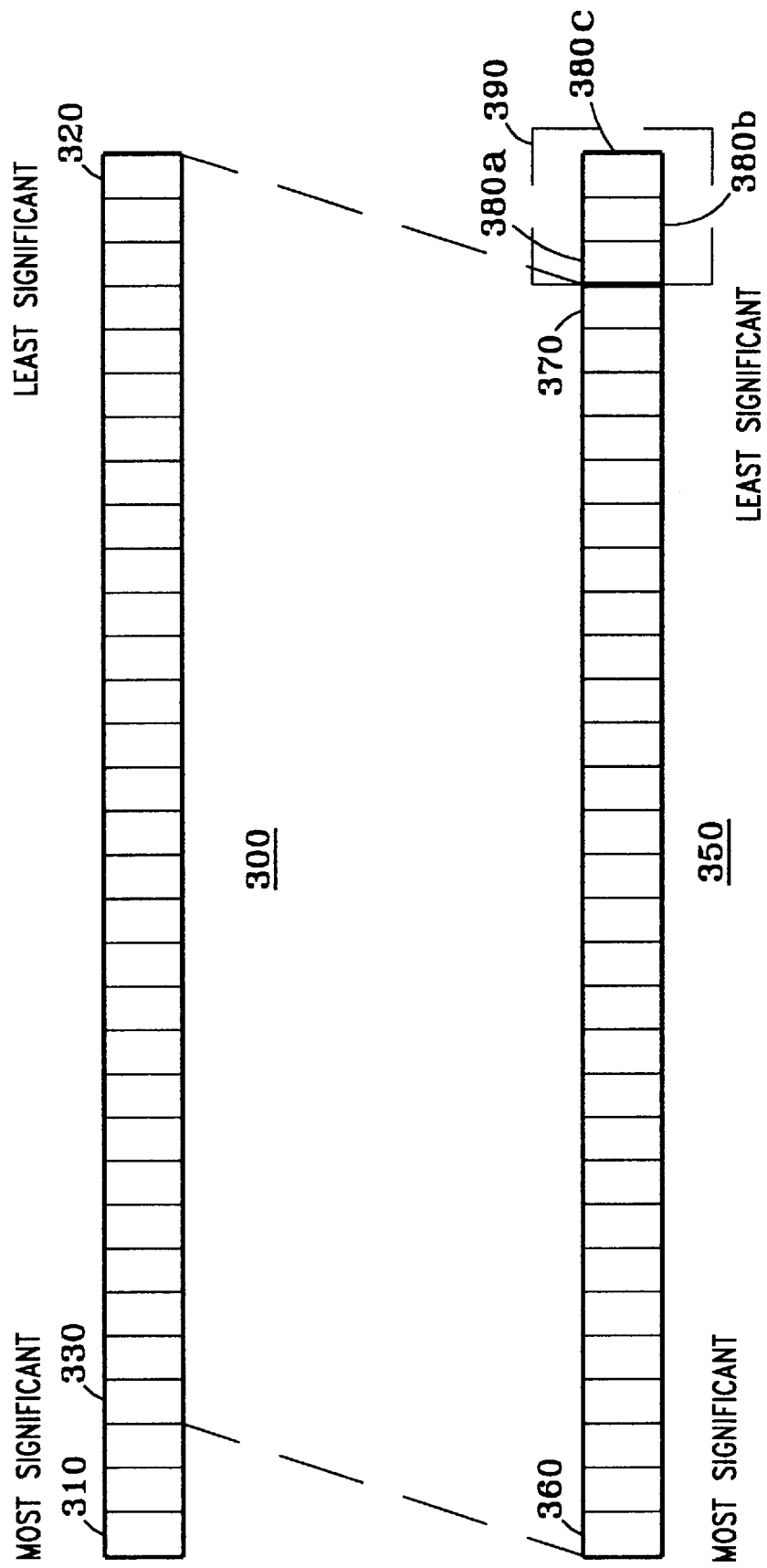
FIG. 3 is a representation of a conventional display word representing a single pixel used in a conventional black and white images and one modified according to the present invention.

FIG. 3 illustrates a data word 300 of a single pixel in a conventional digital image. In this example, 32 bits are contained in the pixel and each bit has either the numeric value 0 or 1. Data word 300 has a most-significant bit 310, a least-significant bit 320 and a fourth most-significant bit 330.

Enhanced data word 350 is data word 300 after being modified according to the present invention. Enhanced data word 350 has a most significant bit 360. Additional information 390 is inserted below a least-significant bit 370 of enhanced data word 350. In this illustration, additional information 390 is comprised of three bits 380a, 380b and 380c. This three bit insertion is consistent with use of the first embodiment of the invention in which three orthogonal flow directions are inserted into the data. This three bit insertion is also consistent with the use of the second embodiment in which M=3.

Least significant bit 370 corresponds to the original least significant bit of the unaltered data 320 of data word 300 and most significant bit 360 corresponds to the fourth most significant bit 330 of data word 300.

Figure 4:
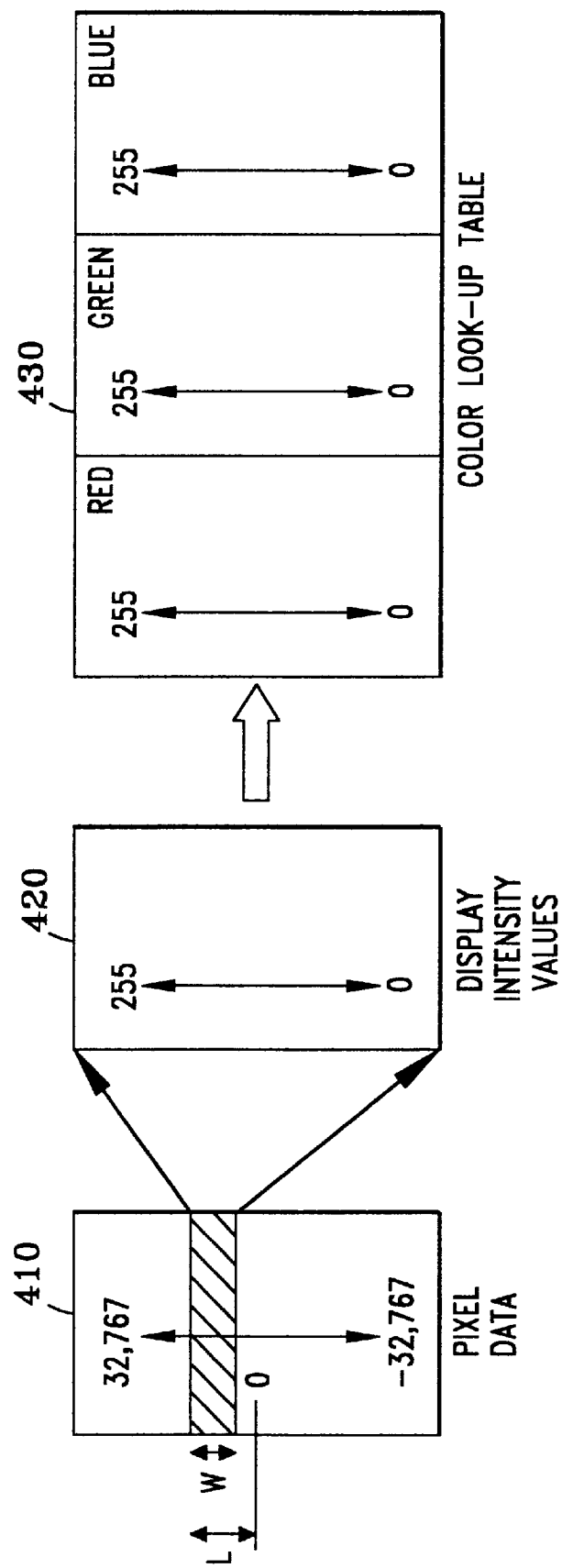
FIG. 4 is a representation of a conventional color mapping used in the display of image data.

FIG. 4 illustrates the conventional process in which pixel data in an image is converted into intensities for display on a color monitor, in this example, a 16 bit dynamic range for each display word resulting in values between −32,768 and 32,767. Since the full dynamic range of the image data greatly exceeds that of the human eye, a subset of the full range of the data is chosen by the operator. This subset is specified by two parameters, a window, W, and a level, L.

Window W specifies the range of pixel intensity values which are passed to the display hardware. Level L specifies the average pixel intensity value passed to the display hardware. In conventional display systems, the pixel intensities specified by W and L are scaled and interpolated to give numeric display intensity values 420 which for an 8 bit display has values between 0 and 255. Pixels whose values exceed the upper bound of the subset are given a display value of 255 and pixels whose values are less than the lower bound of the subset are given a display value of 0. In practice the operator can easily manipulate W and L (typically with knobs) and rapidly adjust the contrast and brightness of the displayed image to optimize the visualization of any part of the image.

If the final display driver is designed to drive a black-and-white monitor, then display intensity values 420 are directly sent to the digital-to-analog converters (DACs) which in turn provide the intensity drive voltages to the monitor.

For color monitors, display intensity values 420 are typically passed to a color look-up table 430 which converts each display intensity value into display intensity values for the red, green and blue drivers of the display. If a gray scale image is displayed using color look-up table 430, then the numeric outputs of the red, green and blue drives are equal to each other and vary from 0 to 255. When red, green and blue are all 0, then the monitor displays black. When red, green and blue are all 255 then the monitor displays white. Intermediate values give intermediate levels of gray.

Figure 5:
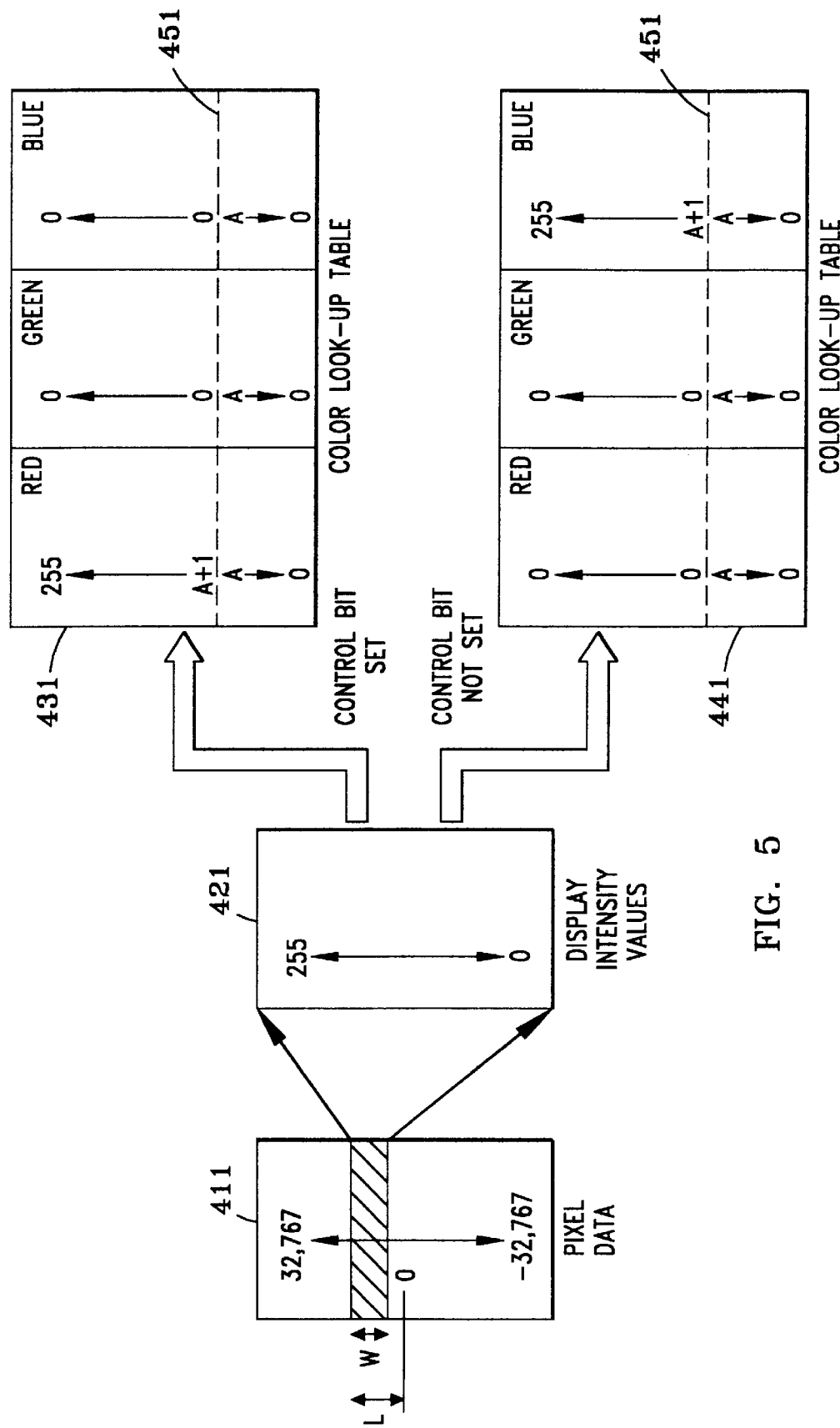
FIG. 5 is a representation of a first embodiment of color mapping of display words with 'smuggled' bits according to the present invention.

In the present invention, the additional data which has been inserted into the original data is not viewable using conventional image display systems. Consequently, one aspect of the current invention is alternate display mechanisms which can make use of the inserted data. A first example of this is shown in FIG. 5. Here a pixel datum 411 is analyzed in the conventional fashion for a given window W and level L, to give a display intensity value 421. In accordance with the present invention, however, one of the bits contained in the additional information (390 of FIG. 3) becomes a control bit and is used to select between two color look up tables. If the control bit is set (i.e. =1), then a first color look-up table 431 is selected. If the control bit is not set (i.e. =0) then a second color look-up table 441 is selected. In an additional aspect of the present invention, each color look-up table can be dynamically modified by the operator through the specification of a color threshold 451. In the present example, color look-up values below the threshold, shown as value A in FIG. 5, are set to give an image appearance identical to a conventional black and white image. Color look-up table values above the color threshold are modified to give a colorized image.

With the example given in FIG. 5, phase-contrast MRA data obtained in accordance with the first embodiment of the present invention would appear as a conventional black-and-white image when the color threshold 451 is maximized (i.e. A=255). As the threshold is lowered, however, pixels whose magnitudes have a display value greater than A will be displayed with a colorized look-up table.

In the example shown in FIG. 5, those pixels whose control bit is set will be given a red hue since the green and blue components are zeroed. Alternatively, those pixels whose control bit is not set will be given a blue hue. With phase-contrast angiography data, vessels carrying blood in a selected direction will appear red while vessels carrying blood in the opposite direction will appear blue.

Figure 6:
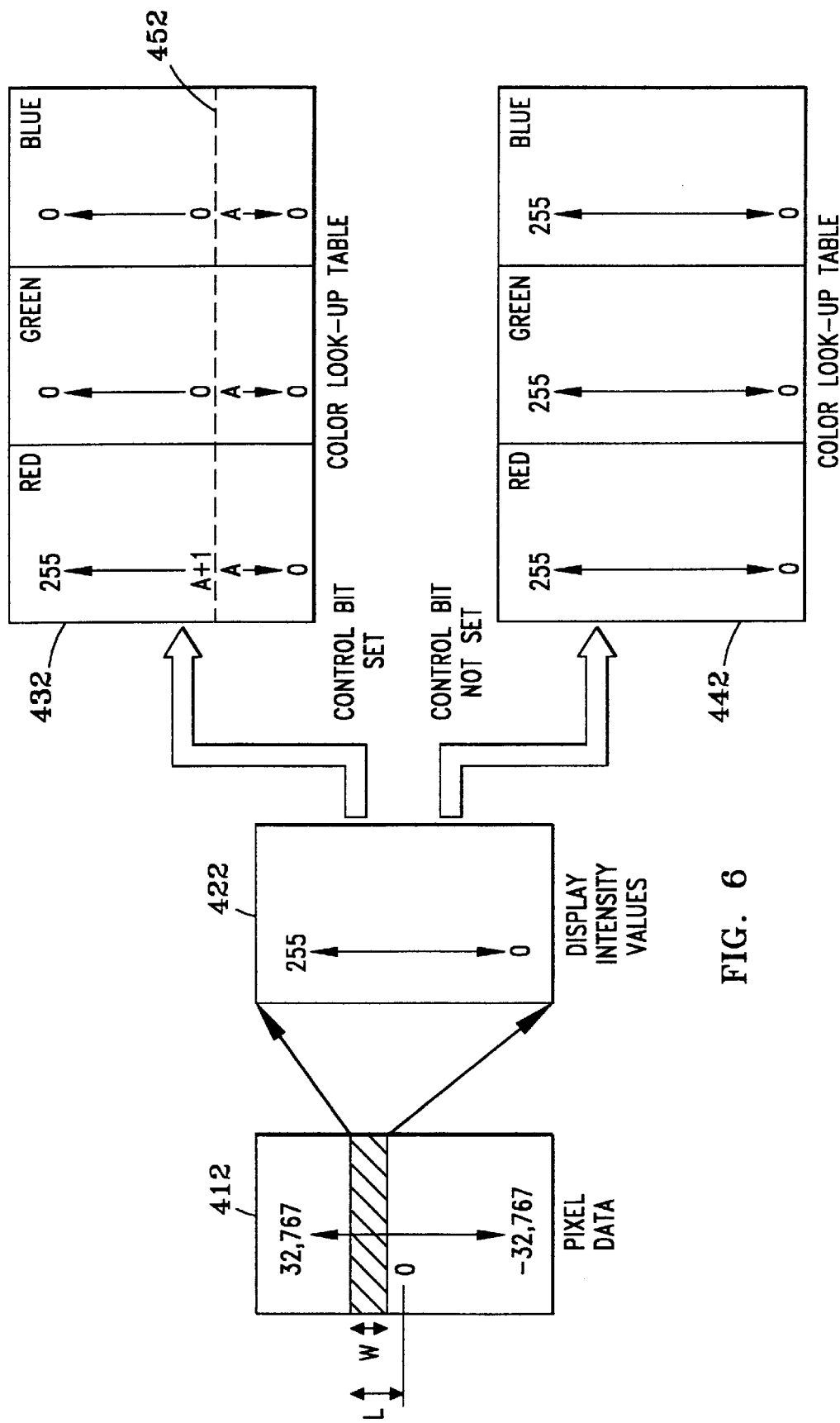
FIG. 6 is a representation of a second embodiment of color mapping of display words with 'smuggled' bits according to the present invention.

FIG. 6 shows an alternative color mapping scheme in which a pixel datum 412 is reduced to a display intensity value 422 which in turn drives either a first color look-up table 432, or a gray scale-lookup table 442 depending on the status of a selected control bit. A color threshold 452 is applied to first color look-up table 432 as described above, but not to second color look-up table 442. Consequently, when pixel display word intensities are above the color threshold value, A, they are colorized only if the control bit is set. With phase-contrast angiography data, vessels carrying blood in a selected direction will appear red while vessels carrying blood in the opposite direction will appear with the conventional black-and-white appearance.

Figure 7:
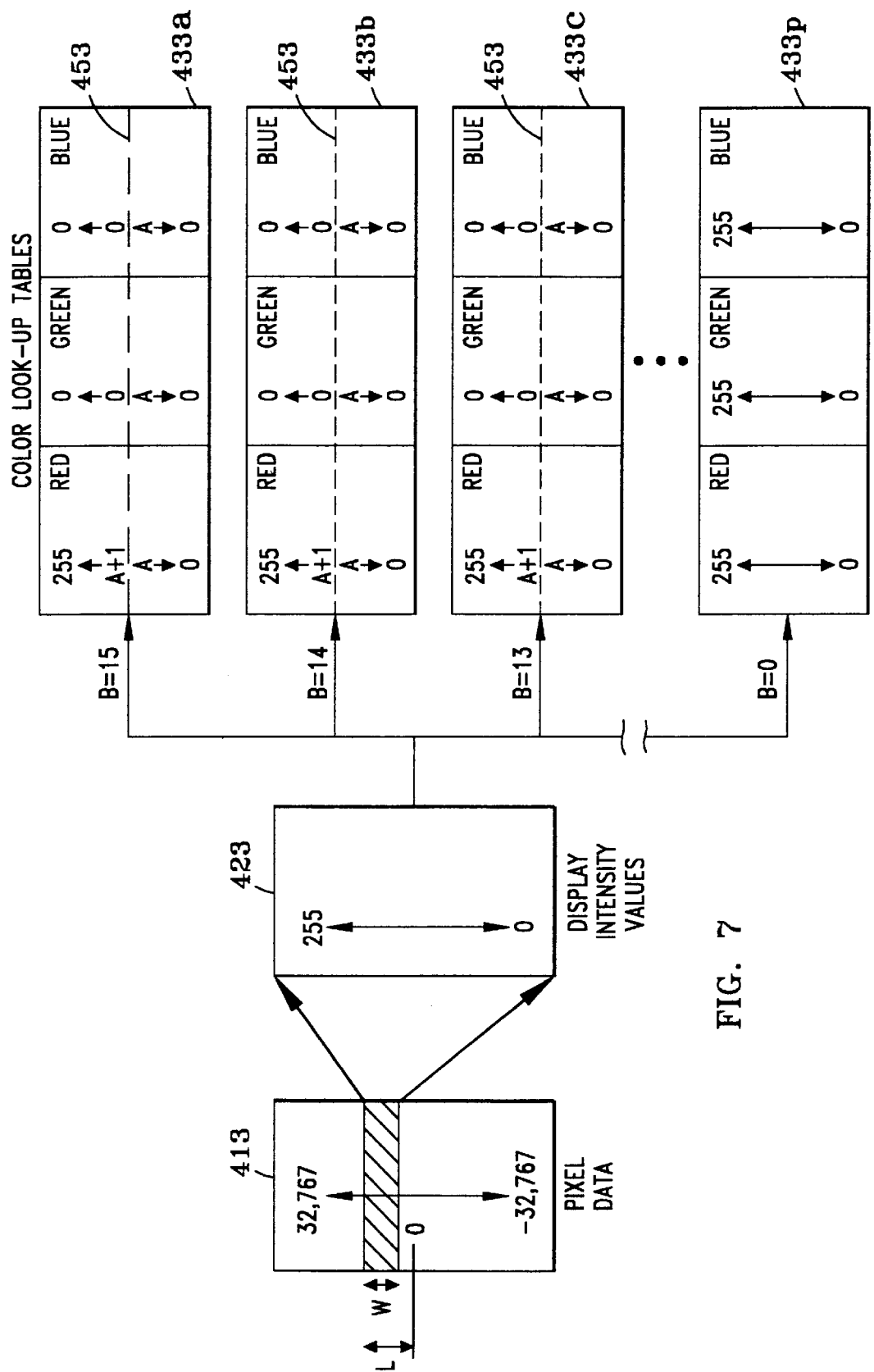
FIG. 7 is a representation of a third embodiment of color mapping of display words with 'smuggled' bits according to the present invention.

In the embodiments of the present invention disclosed in FIGS. 5 and 6, a single control bit is used to select the color look-up table. In alternate embodiments, M bits can be used to select between $2^M$ lookup tables as shown for M=4 in FIG. 7. In this embodiment of the invention a pixel datum 413 is reduced to a display intensity value 423 which in turn drives one of sixteen color look-up tables 433a, 433b, 433c ... 433p. The selection of the color look-up table determined by the value, B, of the M=4 control bits. A color threshold 453 is applied to each color look-up table 433 as described above, but not to last color look-up table 433p.

Thus, functional MRI data acquired and reduced in accordance with the second embodiment of the present invention in which M=4, are displayed with 16 different color look-up tables. Pixels in the image having no changes with respect to the reference image (i.e. no functional activation) have a zero stored as the additional information (i.e. B=0) which causes the display to select a conventional black-and-white look-up table 433p. Image pixels having moderate changes would cause the display to select a 'cool' hue such as blue for its look-up table. Image pixels having greater changes would cause the display to select an intermediate hue such as green for its look-up table 433c. Image pixels with large changes would cause the display to select a 'hot' hue such as red for its look-up table 433a. As with the embodiments illustrated in FIGS. 5 and 6, a color threshold allows the user to dynamically select the amount of colorizing applied to the displayed image.

With the present invention, any colorized look-up table is possible. With the illustrated embodiments the operator has the impression that selected image pixels are viewed through colored glass (i.e. the details of the underlying source image are still apparent). The hue of the colored glass (e.g. red, green, blue etc.) is determined by the control bits which contain additional information (e.g. flow direction, degree of functional activation etc.). In our previous example, the if the operator wishes to determine the direction of flow in the left/right axis, then the value of the bit in the position corresponding to the reduced left/right velocity information can be used to select between two alternative color look-up tables. Pixel data with the 'left/right' bit set could be represented with a red-to-black color table while pixel data with the 'left/right' bit not set could be represented with a blue-to-black color table. Alternatively, if display of only flow in a single direction is desired, then the color-to-black lookup table can be applied for only those pixels having the appropriate inserted bit value, and a conventional white-to-black look-up table used for all other pixels.

The use of a color threshold permits the colorization of only relevant pixels and leaves the non-relevant pixels (e.g. noise background outside the imaged anatomy) displayed in black and white.

Figure 8:
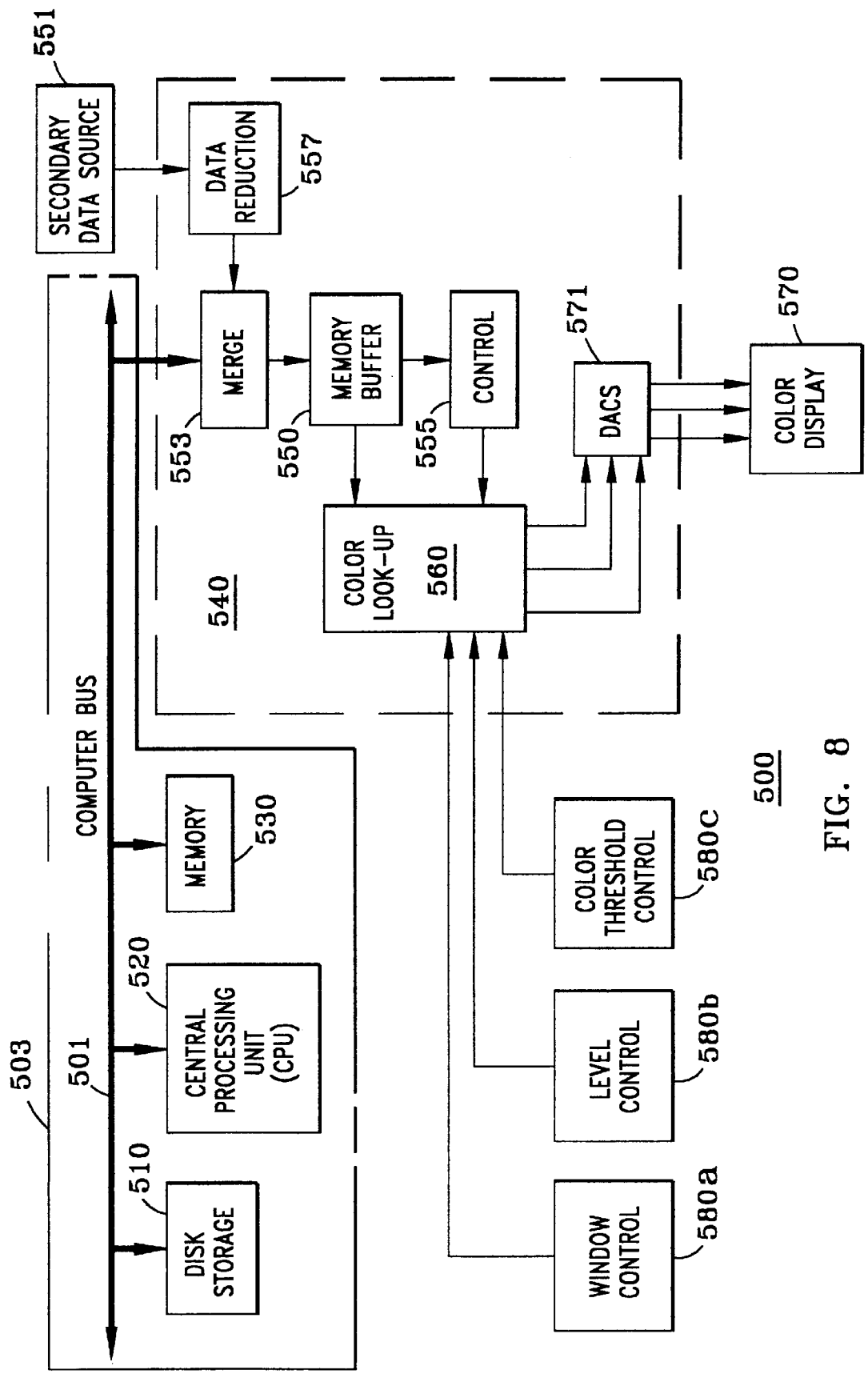
FIG. 8 is a simplified block diagram of one embodiment of the present invention for creating and displaying enhanced image data.

FIG. 8 illustrates one embodiment of a hardware system 500 for the incorporation of additional image data into a primary digital image which may be displayed as the primary image with little change in dynamic range or visible appearance, or may be displayed as an enhanced image, with color coding or overlays. A computer bus 501 connects a disk storage means 510, a Central Processor Unit (CPU) 520, and a memory means 530, to a graphic display subsystem 540, and acts as a source of primary data.

Graphic display subsystem 540 is comprised of a memory buffer 550, a control device 555, and a color look-up device 560. Color look-up device 560 is connected to user input devices comprised of a window control 580a, a level control 580b and a color threshold control 580c.

In accordance with the present invention CPU 520 acquires a primary data set, which may be in memory 530 or stored on disk storage device 510, and inserts it into a working memory buffer 550 via a merge device 553.

A data reduction device 557 either has pre-stored, or receives as user-defined, a desired dynamic range required for playback, indicating a number of playback bits D. It also has pre-stored, or is user-supplied with, the word width of the playback device P intended to be used. From this data reduction, device 553 determines the amount of free bits, F, which may be merged into the primary data set words.

Data reduction device 557 is coupled to a secondary data source 551. The secondary data source 551 may physically be the same acquisition equipment used to acquire the primary data set, but produces a secondary data set. Data reduction device 557 reduces the secondary data words down to reduced secondary data words each having M bits.

Data reduction device 557 in certain circumstances determines an appropriate length for M, such as when the secondary data may be reduced to a fixed number of bits. For example, flow direction data may be defined in three bits with each bit indicating a direction along three orthogonal directions.

Merge device 553 is coupled to the data reduction device 557 and receives the M least signicant bits of the primary data word and the M bits of each secondary data word. It also receives information from the data reduction device 557. Merge device is also coupled to memory buffer 550 and shifts each primary data word M bit positions toward the most significant bit, and inserts the M bits of the reduced secondary data word into the M least significant bit positions.

In the event that F was determined to be less M, then the merge device 553 shifts the primary data word by F bits and inserts M bits of the reduced secondary data word into the lowest M bits of the primary data word. The merged primary and secondary data word information results in a new enhanced data set with enhanced data words of the same width as the primary data set words.

The enhanced data words have the secondary data information merged into the lowest bits. This will only minimally affect the values, especially if M is chosen to be about or below the number of bits equivalent to the level of background noise. This allows the enhanced data sets to be displayed as if they were unaltered primary data sets on conventional playback equipment. For example, enhanced color coded MR angiography data may be displayed as original gray scale information on conventional gray scale MR Scanners with little or no change in dynamic range, image quality, or storage space. These same enhanced data sets may also be viewed as color coded images on an enhanced MR Scanner employing the present invention.

On playback, CPU 520 places the enhanced digital image into display memory buffer 550.

Color lookup device 560 receives the window, level, and color threshold information from the window, level and color threshold control devices 580a, 580b, 580c, respectively. It then creates at least one color lookup table with the entries above the color threshold shades of a predetermined color or colors. Entries at, and below, the color threshold define shades of gray scale. Each entry has an index. The table is constructed such that the window range maps into indices of the lookup table and spans all indices of the table.

A control device 555 reads the additional information stored in the M least significant bits of the enhanced data word and acts accordingly.

In color coding of digital images, the additional data indicates which lookup table within color lookup device 560 to use.

Color lookup device 560 then provides the extracted color or gray scale to Digital-to-Analog converters 571 (DACs) which create analog signals to drive the red, green and blue channels of color display 570.

Variations of the Invention

Although the invention is described above as a system for the manipulation and display of MR data, it is also suitable for use with any digital image.

The concept of 'smuggling' information into the lower bits can be applied to any digitally encoded data.

The best use would be for merging additional information from a second data set into the primary data set which has entries that correspond to the primary data set. As mentioned above, two volumetric data sets with entries representing two different physical characteristics at the same location could easily be combined. Merging these two data sets reduces the amount of redundant information.

In other embodiments, text, voice, or sounds in general may be 'smuggled' into an image to which they pertain without affecting image quality. This allows a description of an image or video clip to be embedded within the image or video clip itself. It provides integral multi-media. Enhanced media of this form are fully compatible with older media players not capable of reading the embedded information.

In still another embodiment, small programs, or applets may be 'smuggled' in a primary data set, such as an image. These applets may then be executed, even on the image itself.

In yet another embodiment, supplementary information may be incorporated into digital audio data with minor detriment to sound quality (chosen to be below the level of audible detection).

Figure 9:
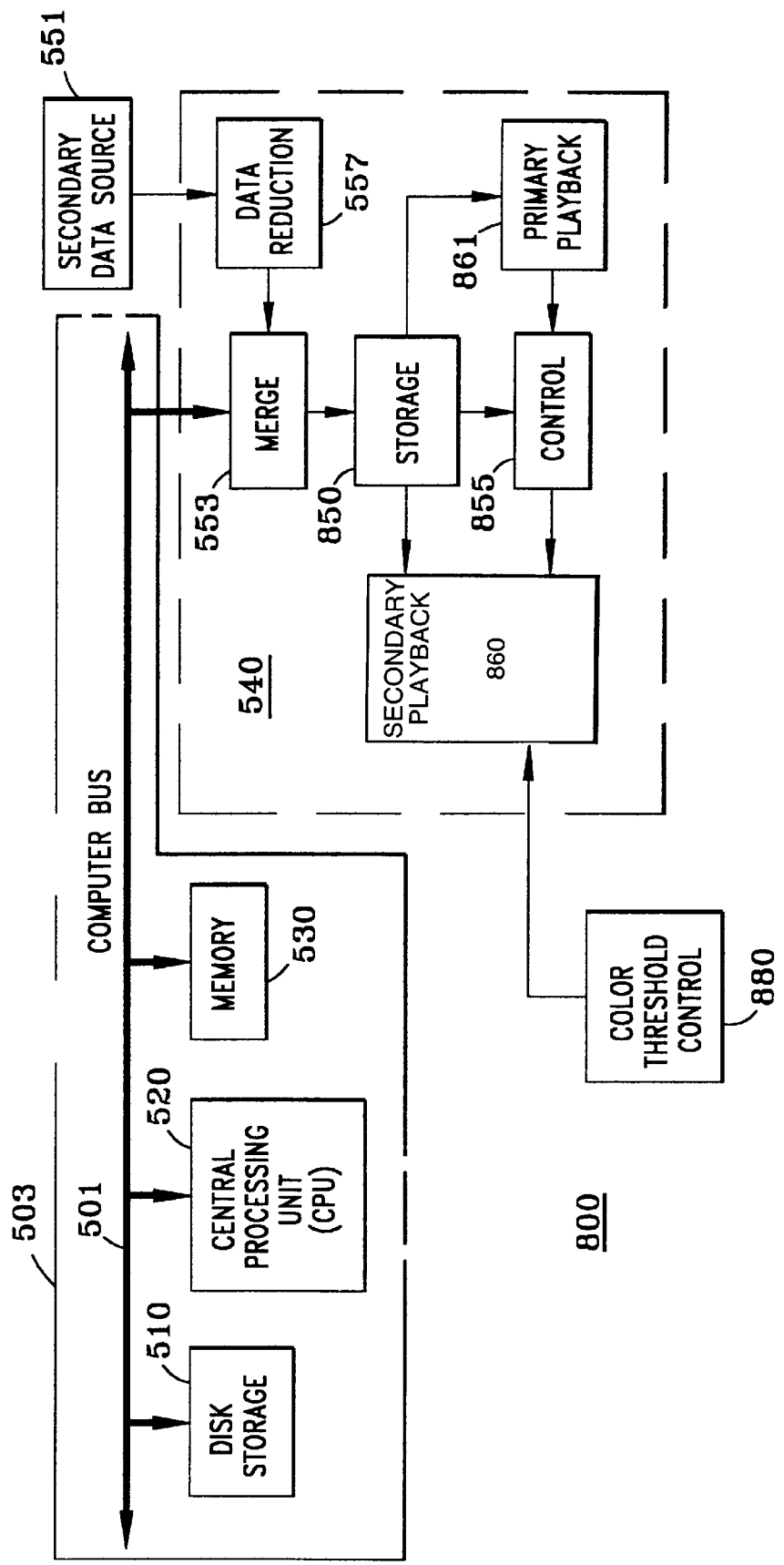
FIG. 9 is a simplified block diagram of a second embodiment of the present invention for creating and playing back enhanced data sets.

FIG. 9 shows a generalized version of an embodiment of the present invention. Much is as described for FIG. 8 above. Since both data sources for FIG. 8 involved digital image playback, some elements shared in FIG. 8 are split up for the embodiment shown in FIG. 9.

As before, there are a primary data source 503 and a secondary data source 551. Data from both sources are merged into the enhanced data and stored in storage device 850.

A primary playback device 861 is coupled to the storage device and could play back the enhanced data as if it were unaltered primary data.

A control device 855 coupled to the storage device 850 reads the lowest M bits and passes them to a secondary playback device 860 allowing playback device 860 to reproduce the original information captured in the secondary data set. Secondary playback device 860 may be a display device, as show in FIG. 8, an audio playback device, a text and superposition device to superimpose textual description on images or video, or any other digital playback device. Secondary playback device 860 is controlled by a user interface 880 which causes the secondary playback device to change one or more aspects of the secondary data output such as volume, data format or the like.

While several presently preferred embodiments of the novel invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of merging secondary data set information into a primary data set without destroying data or reducing a desired dynamic range comprising the steps of:

a) acquiring primary data set having a plurality of data words;

b) acquiring a secondary data set having data words which correspond to entries of the primary data set;

c) reducing the secondary data words to M bits creating a reduced secondary data word;

d) determining a number of bits D for a maximum desired dynamic range on playback;

e) determining a number of bits P in a word of a playback device;

f) merging M bits of reduced secondary data word into M least significant bit positions of the primary data words to result in enhanced data words.

2. The method of merging of claim 1 further comprising, before the step of merging, the step of:

shifting the primary data set words by a number of bit places F equal P–D.

3. The method of merging of claim 1 wherein the primary data set comprises a digital image.

4. The method of merging of claim 1 wherein the primary data set comprises a magnetic resonance image.

5. A system for merging information of a secondary data set from a secondary data source into unused portions of a primary data set from a primary data source with substantially no reduction in dynamic range and signal quality comprising:

a) a storage device capable of storing digital information;

b) a data reduction device coupled to the secondary data source for reducing secondary data words into shorter reduced secondary data words;

c) a merge device coupled to the data reduction device for receiving the reduced secondary data words and incorporating these into the least significant bits of the primary data words and storing them in the storage device as enhanced data words.

6. The system of claim 5 wherein the data reduction device operates to determine a number of bits D for a maximum desired dynamic range on playback, determine a number of bits P in a word of a playback device, pass the values of D and P to the merge device, reduce the secondary data words to a length of M bits, and providing the reduced secondary data words to merge device.

7. The system of claim 6 wherein the merge device operates to shift a plurality of primary data set words toward the most significant bit by a maximum number of bit places F equal to P–D, then merges M bits into M least significant bit positions of the shifted primary data set words to result in enhanced data set words retaining the desired dynamic range, and stores the enhanced data words in storage device.

8. A method for enhancing primary data set words with secondary data set words comprising the steps of:

a) reducing each of said secondary data set words to M bits of data resulting in reduced data words;

b) inserting the reduced data words into the said primary data words.

9. The method of claim 8 further comprising the step of shifting the said primary data words toward more significant bit positions by M bits, prior to the insertion of the M reduced data bits to preserve all the bits of the primary and secondary data words.

10. The method of claim 8 further comprising the step of replacing the M leastmost significant bits of the said primary data words with the M reduced data bits to preserve the dynamic range of the bits of the primary and secondary data words.

11. The method of claim 8 wherein the secondary data set is velocity data from a phase-contrast magnetic resonance image.

12. The method of claim 8 wherein the secondary data set is difference data obtained by computing the difference between a reference data set and a subsequent data set.

* * * * *